United States Patent [19]
Stewart

[11] 4,420,317
[45] Dec. 13, 1983

[54] PROCESS FOR RECOVERING VAPORIZED SOLVENT WHICH ELIMINATES HEAT EXCHANGERS

[76] Inventor: Nelson Stewart, 151-18 35th Ave., Flushing, N.Y. 11354

[21] Appl. No.: 316,354

[22] Filed: Oct. 29, 1981

[51] Int. Cl.³ .............................................. F25J 3/00
[52] U.S. Cl. .......................................... 62/20; 62/28
[58] Field of Search .................. 62/40, 24, 27, 28, 17, 62/20

[56] References Cited

U.S. PATENT DOCUMENTS 3,902,329  9/1975  King et al. .............................. 62/17
4,293,322  10/1981  Ryan et al. .............................. 62/20

*Primary Examiner*—Frank Sever
*Attorney, Agent, or Firm*—Robert L. Nathans

[57] ABSTRACT

Chilled liquid solvent is pumped from a solvent reservoir at the bottom of a tower to an upper portion thereof and thereafter trickles through the tower by gravity and causes upward flowing solvent vapor to be condensed and recovered in the reservoir. The elimination of the use of heat exchangers is effected by introducing liquid nitrogen directly into the liquid solvent reservoir, chilling the solvent to extremely low temperatures. Agitation of the liquid solvent, which is chilled by the boiling liquid nitrogen therein, is employed to eliminate potential icing clogging problems.

12 Claims, 1 Drawing Figure

U.S. Patent  Dec. 13, 1983  4,420,317
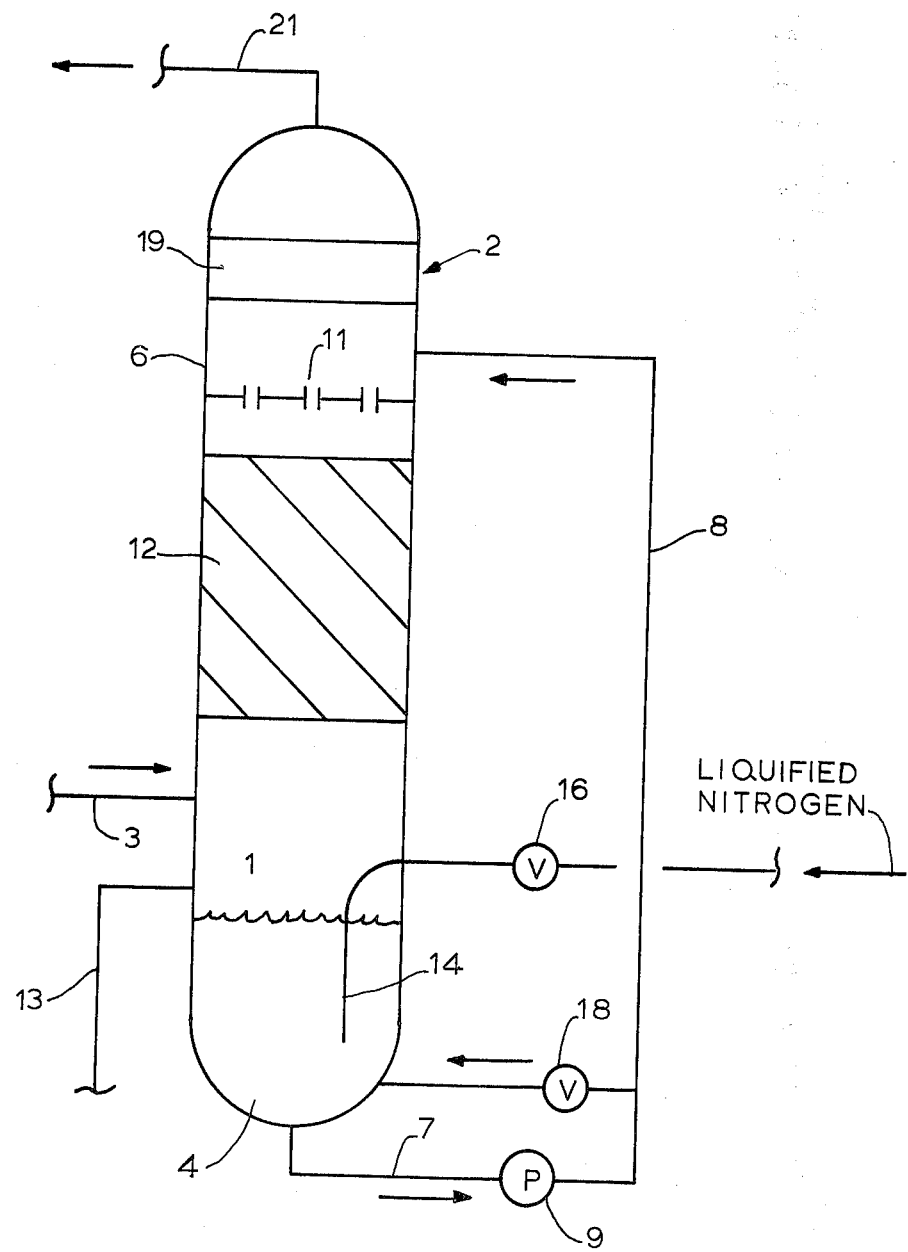

PROCESS FOR RECOVERING VAPORIZED SOLVENT WHICH ELIMINATES HEAT EXCHANGERS

BACKGROUND OF THE INVENTION

The present invention relates to the field of systems for recovering organic solvent vapors such as toluene and benzene. The recovery systems in prior art processes involve chilling a gas stream containing organic solvent vapors to condense the vapors for recovery purposes, without freezing the vapors.

One prior art approach involves spraying liquid nitrogen into nitrogen gas to cool the gas to a predetermined temperature wherein the gas is then employed as an intermediate cooling fluid used to chill and condense solvent vapors in a conventional heat exchanger. A blower is emloyed to circulate the gas. This approach is relatively expensive, makes inefficient use of the liquid nitrogen refrigerant, and is potentially subject to the problems of high solvent viscosity and trace water freezing to be discussed below.

Another system is similar to the above mentioned prior art approach, but uses gas buoyancy effects to circulate the gas without the use of the blower. The equipment required is large, relatively expensive, and potentially subject to high solvent viscosity and trace water freezing problems.

Another approach involves passing liquid nitrogen through a heat exchanger also containing an intermediate fluid which freezes below the boiling point of nitrogen. The intermediate fluid is thereafter involved in direct heat exchange with the organic solvent vapor stream. This system is relatively expensive and is also subject to high solvent viscosity and trace water freezing problems.

The inventor commenced constructing a system employing a tower having packing within an intermediate portion and a liquid reservoir of recovered solvent contained within the lower portion of the tower. Solvent vapor within a stream of nitrogen was introduced below the packing and flowed upwardly through the packing. The liquid solvent was drawn from the reservoir through an indirect heat exchange within which it was chilled, by liquid nitrogen boiling within the exchanger, and then returned to the top of the tower. The chilled liquid solvent flowed downwardly through the packing, chilling the rising vapor and condensing out most of the solvent which accumulated within the reservoir. This system may be characterized as a kind of scrubber. The heat exchanger was a "Trane" aluminum core unit with several layers of dummy core between the liquid nitrogen containing tubing and the solvent containing tuning. Liquid nitrogen was introduced into the heat exchanger and had a temperature of about $-320°$ F. However, typical solvents freeze around $-50°$ to $-100°$ F. and ideally, one wishes to chill the solvent very close to its freezing point without freezing it, in order to recover as much solvent as possible by condensation in the intermediate portion of the tower containing the packing.

A control valve is employed to control and limit the flow rate, and hence the temperature of the boiling nitrogen in the exchanger in response to a signal from a temperature transducer. If the liquid nitrogen in the exchanger is too cold, liquid solvent will freeze in the exchanger and the system is fouled, and must be shut down. If it is not cold enough, the resulting warmer liquid solvent transported to the packing will cause less solvent to be condensed than would otherwise ideally be the case. Thus, maintaining the temperature of the liquid nitrogen between narrow limits within the heat exchanger is highly desirable and yet is somewhat difficult to achieve.

Another problem encountered by the inventor was that the liquid solvents often became so viscous at the resulting low temperatures that they became difficult to pump through the tiny tubing passages of the exchanger. The result is the requirement for additional wasteful pumping power and a larger, more expensive pump.

The inventor also tested this system for sensitivity to water in the vapor stream. About 2% water vapor was added to the incoming gaseous nitrogen and solvent vapor, and all surfaces in the scrubber were wet with liquid solvent. It was hoped that any water entering would freeze into tiny ice crystals immediately upon exposure to the below zero scrubber. The tiny ice crystals were suspended in the liquid solvent and did not cause clogging or fouling of passages in the heat exchanger. However, when the system was turned off, the ice melted and when the system was thereafter started up, the water froze in the heat exchanger and clogged its passages. As a result, the system would have to be completely drained every time it was turned off, and the system would have to thereafter be refilled with water-free solvent before start-up. This procedure is a serious operating nuisance.

It is object of the present invention to eliminate the heat exchanger described above in order to solve the above stated problems in connection with high solvent viscosity and the freezing of residual water upon startup.

It is a further object of the present invention to eliminate the necessity of maintaining the solvent just above its freezing point without actually freezing the solvent in the heat exchanger which results in clogging of the passages therein.

It is yet a further object of the invention to reduce costs by eliminating the heat exchanger altogether.

SUMMARY OF AN EMBODIMENT OF THE INVENTION

In accordance with the present invention, the heat exchanger is eliminated, along with the above stated problems associated therewith, and liquid nitrogen is directly injected into the body of the liquid solvent reservoir, preferably well under the surface thereof. The liquid nitrogen rapidly cools the liquid solvent and since the liquid nitrogen boils in the liquid reservoir, it provides enough agitation so that ice formed within the reservoir is broken up to the extend that the liquid solvent may be readily pumped to the top of the tower where it flows downwardly in contact with the upwardly rising organic solvent vapor. Additional agitation may be provided if desired by redirecting a portion of the liquid solvent pumped from the reservoir directly back into the reservoir. Agitation is sufficient to prevent problem freezing of the liquid solvent. The system of the invention may thus employ relatively simple and inexpensive equipment which is at the same time immune from the clogging problems associated with trace water freezing, and is unaffected by high solvent viscosity at low temperatures.

Other objects, features and advantages of the present invention will become apparent upon the study of the following detailed description taken in conjunction with the FIGURE illustrating a preferred embodiment of the invention.

BRIEF DESCRIPTION OF THE DRAWING

The drawing shows the best mode of the invention.

DETAILED DESCRIPTION

Nitrogen gas acting as a carrier for solvent vapor to be recovered is introduced into lower portion 1 of tower 2 via pipe 3. A reservoir of chilled liquid solvent 4 is contained within the lower portion of the tower. The chilled solvent is transported to the upper portion 6 of the tower by means of piping 7 and 8 and pump 9. The chilled solvent thereafter flows downwardly by virtue of gravity through distribution trays 11 and packing 12, where it condenses the upwardly flowing vapor passing through packing 12. The condensed solvent is thereafter accumulated at the lower portion 4 until it overflows through overflow pipe 13 which enables recovery of the solvent. The above mentioned heat exchanger is eliminated by introducing liquid nitrogen well below the surface of the solvent reservoir by means of pipe section 14. Because the chilled solvent is much warmer than the liquid nitrogen, the nitrogen immediately boils, chills the solvent, and produces particles of ice within the solvent reservoir. However, due to the considerable resulting turbulence, the ice is broken up to the extent that it is readily pumped through pump 9 and is transported to the upper portion of the tower. Valve 16 is employed to control the flow rate of the liquid nitrogen introduced into the solvent reservoir. However, the flow rate need not be maintained within the relatively narrow limits previously required in connection with the use of the heat exchanger. Optionally, a portion of the liquid solvent may be pumped back through valve 18 to produce further turbulence in the liquid reservoir. Additionally, or in the alternative, a stirring device may be employed to maintain turbulence. Demister 19 is preferably employed at the top of the tower. The boiling nitrogen within the solvent reservoir and the nitrogen employed as a carrier for the solvent vapor introduced by piping 3 is recovered at the top of the tower via pipe 21.

A production prototype of the above mentioned apparatus was constructed by the inventor, and is now successfully in operation. The tower has a height of 6 feet.

It may also be feasible to direct a stream of liquid nitrogen at the liquid reservoir from above the surface thereof. However, it is believed that this procedure would create a problem due to the nitrogen freezing at the exit orifice of a pipe or a spray head positioned above the surface of the solvent reservoir.

It is also within the scope of the invention to employ other liquified gases such as cryogen.

I claim:

1. A process for recovering solvent vapor by passing said vapor through a container having a first, second, and third portion while contacting in said second portion, flowing chilled liquid solvent, which condenses said vapor, the first portion of said container including a liquid solvent reservoir of recovered liquid solvent, comprising the steps of:

introducing said solvent vapor into said first portion of said container;

transporting chilled liquid solvent from the liquid solvent reservoir in said first portion of said container to said third portion of said container for enabling said liquid solvent to flow through liquid/vapor/gas contacting means positioned within said second portion of said container to condense solvent vapor within said second portion; and, introducing liquified gas directly into said liquid solvent reservoir within said first portion of said container at rates selected to provide turbulence sufficient to avoid equipment clogging problems otherwise incidental to tracewater freezing in said liquid solvent.

2. The process of claim 1 further including the step of maintaining said liquid solvent within said reservoir in a state of agitation.

3. The process of claim 2 wherein said liquid solvent reservoir is at least partially maintained in said state of agitation by transporting said liquid solvent out of the reservoir in said first portion of said container and reintroducing a portion of said liquid solvent back into said reservoir without contacting said vapor in said second portion of said container.

4. The process as set forth in claims 1, 2 or 3 wherein said liquified gas is directly introduced into said liquid solvent reservoir well below the surface thereof.

5. A process for recovering solvent vapor by passing said vapor upwardly through a tower having a lower, intermediate and upper portion, while contacting in said intermediate portion, downwardly flowing chilled liquid solvent which condenses said vapor, the lower portion of said tower containing a liquid solvent reservoir of recovered liquid solvent, comprising the steps of:

introducing said solvent vapor into said lower portion of said tower;

transporting chilled liquid solvent from the liquid solvent reservoir in said lower portion of said tower to said upper portion of said tower for enabling said liquid solvent to flow downwardly through liquid/vapor/gas contacting means positioned within said intermediate portion of said tower to condense upwardly flowing solvent vapor within said intermediate portion; and, introducing liquified gas directly into said liquid solvent reservoir within said lower portion of said tower at rates selected to provide turbulence sufficient to avoid equipment clogging problems otherwise incidental to trace-water freezing in said liquid solvent.

6. The process of claim 5 further including the step of maintaining said liquid solvent within said reservoir in a state of agitation.

7. The process of claim 6 wherein said liquid solvent reservoir is at least partially maintained in said state of agitation by transporting said liquid solvent out of the reservoir in said lower portion of said tower and reintroducing a portion of said liquid solvent back into said reservoir without contacting said vapor in said intermediate portion of said tower.

8. The process as set forth in claims 5, 6, or 7 wherein said liquified gas is directly introduced into said liquid solvent reservoir well below the surface thereof.

9. A process for recovering solvent vapor by passing said vapor upwardly through a tower having a lower, intermediate and upper portion while contacting in said intermediate portion, downwardly flowing chilled liquid solvent which condenses said vapor, the lower portion of said tower containing a liquid solvent reservoir of recovered liquid solvent, comprising the steps of:

introducing said solvent vapor within a stream of inert gas into said lower portion of said tower;

transporting chilled liquid solvent from the liquid solvent reservoir in said lower portion of said tower to said upper portion of said tower for enabling said liquid solvent to flow downwardly through liquid/vapor/gas contacting means positioned within said intermediate portion of said tower to condense upwardly flowing solvent vapor within said intermediate portion; and, introducing liquid nitrogen directly into said liquid solvent reservoir within said lower portion of said tower at rates selected to provide turbulence sufficient to avoid equipment clogging problems otherwise incidental to tracewater freezing of said liquid solvent.

10. The process of claim 9 further including the step of maintaining said liquid solvent within said reservoir in a state of agitation.

11. The process of claim 10 wherein said liquid solvent reservoir is at least partially maintained in said state of agitation by transporting said liquid solvent out of the reservoir in said lower portion of said tower and reintroducing a portion of said liquid solvent back into said reservoir without contacting said vapor in said intermediate portion of said tower.

12. The process as set forth in claims 9, 10, or 11 wherein said liquid nitrogen is directly introduced into said liquid solvent reservoir well below the surface thereof.

* * * * *